even though to
UNITED STATES PATENT OFFICE.

MATTHEW GRAFF AND JAMES JOHNSON, OF PITTSBURG, PENNSYLVANIA.

PROCESS OF REDUCING METALLIC ORES.

SPECIFICATION forming part of Letters Patent No. 406,210, dated July 2, 1889.

Application filed May 10, 1888. Serial No. 273,445. (No specimens.)

*To all whom it may concern:*

Be it known that we, MATTHEW GRAFF and JAMES JOHNSON, citizens of the United States, residing at Pittsburg, in the county of Allegheny and State of Pennsylvania, have invented or discovered certain new and useful Improvements in Processes of Reducing Metallic Ores, of which improvements the following is a specification.

The invention described herein relates to certain improvements in the reduction of that class of ores—such as nickel, silver, cobalt, &c.—which are generally found in nature in the form of sulphides or carbonates, and require reduction by roasting to the form of oxides prior to their reduction to a metallic form This reduction of the oxides to a metallic form is effected by heating the ores in the presence of carbonaceous material—*i. e.*, charcoal, coke, bituminous or anthracite coal, which readily combine with the oxygen of the ore; but on account of the rapid combustion of the carbonaceous material when exposed to the direct action of the heat and oxygen in the furnace sufficient time is not allowed for a thorough disassociation of the oxygen; hence it has been necessary either to inclose the mixed ore and carbonaceous material in close crucibles, retorts, or other analogous vessels, in order to protect the carbon from the oxygen of the air, or employ a form of carbon—*i. e.*, graphite—which is very slow in combustion, or to retard the combustion of the carbon by coating it with some inert material, as set forth in an application, Serial No. 259,795, filed by Matthew Graff January 4, 1888. As described in said application, the carbonaceous material, in the form of coke, charcoal, gas-carbon bituminous or anthracite coal, is reduced to the desired size and then coated with lime, magnesia, clay, or other material of like nature, either by immersing the carbonaceous material in a bath formed of water and lime or magnesia, or by pouring a wash of such material over the carbonaceous material; or the wash may be applied in any other suitable manner. The ore, which has been previously roasted, is broken up or reduced to small lumps and then thoroughly mingled with the coated carbonaceous material, the quantity of carbonaceous material employed being about fifteen to thirty-five per cent., by weight, of the ore, dependent upon the kind and quality of the ore under treatment. These thoroughly-mixed materials are then charged into any suitable form of furnace and subjected to a suitable degree of heat. The heat to which the charge is subjected is sufficient, were it not for the presence of the coating, to consume the carbonaceous material with such rapidity that the carbon of the charge would be entirely destroyed before the oxygen of the metallic oxide in the ore could be thoroughly or even to a material extent evolved and combined with the carbonic oxide; but the coating of lime, magnesia, &c., so checks or retards the combustion of the carbonaceous material that the carbonic oxide is generated at such a slow rate as to permit the oxygen evolved from the ore to combine with the carbonic oxide, forming carbonic acid.

In smelting ores containing more than about ten per cent. of gangue we use, in combination with the ore and carbonaceous material prepared and intimately mixed as above described, a suitable flux or fluxes—such as borax, fluor-spar, cryolite, &c.—in about the proportion of ten per cent. of the whole charge, to produce, by combination with the earthy matter and gangue, a glassy and fluid slag. This slag, being quite fluid and of a less specific gravity than the charge, will cover the latter, thereby protecting both the carbonaceous material and the reduced molten metal from the oxidizing action of the flame. The flux attacks the lime covering of the carbonaceous material, and, combining therewith, gradually eats it away, leaving the naked carbonaceous material in intimate contact with the ore, both the ore and carbonaceous material being, as above stated, fully protected by the superincumbent slag from the action of the oxygen in the atmosphere of the furnace. The internal heat caused by the chemical action of the flux or slag upon the lime or magnesia coating assists materially in the reducing action of the carbon after the coating has been cut off, as above stated.

The reducing operation can be performed on the open hearth of a reverberatory furnace, the hearth being formed of fire-brick or tile laid in any suitable manner, preferably so as to form a concave bottom, so as to form a receptacle for the molten metal, which is tapped off either during or after the reduction of the charge. This bottom is preferably covered to a depth of half an inch, more or less, with a mixture of solid carbon—as coke, gas-carbon, or hard coal—with a sufficient amount of lime, magnesia, loam, or other suitable retarding agent; but we do not confine ourselves to the use of a carbonaceous bottom, as we have obtained good results upon an ordinary bottom of set furnace-sand or upon the naked surface of the brick-work forming the bottom.

We claim herein as our invention—

1. The herein-described method of reducing and smelting ores, which consists in intimately mixing the ore with carbonaceous material protected as against rapid combustion by a coating of suitable material, and with a suitable flux adapted to combine with the protecting coating, and then subjecting the mixture to the action of a reducing-flame in a suitable furnace, substantially as set forth.

2. The herein-described method of reducing and smelting ores, which consists in intimately mixing the ore with carbonaceous material coated with lime and adding thereto a suitable flux, and then subjecting the mixture or charge to the action of a reducing-flame, substantially as set forth.

3. The herein-described method of reducing and smelting ores, which consists in intimately mixing the ores with carbonaceous material protected by a coating of suitable material as against rapid combustion, and with borax, and then subjecting the mixture or charge to the action of a reducing-flame in a furnace having a carbonaceous bottom coated with a material adapted to retard the combustion thereof, substantially as set forth.

In testimony whereof we have hereunto set our hands.

MATTHEW GRAFF.
JAMES JOHNSON.

Witnesses:
DARWIN S. WOLCOTT,
R. H. WHITTLESEY.